Oct. 21, 1941.    H. P. KUEHNI    2,260,036
TRANSMISSION DYNAMOMETER
Filed Aug. 24, 1940
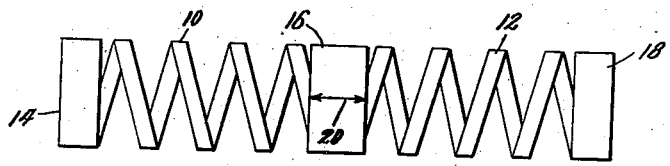
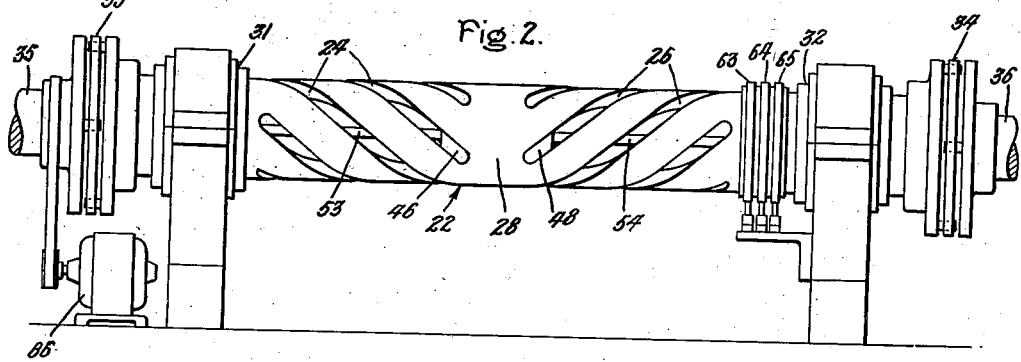
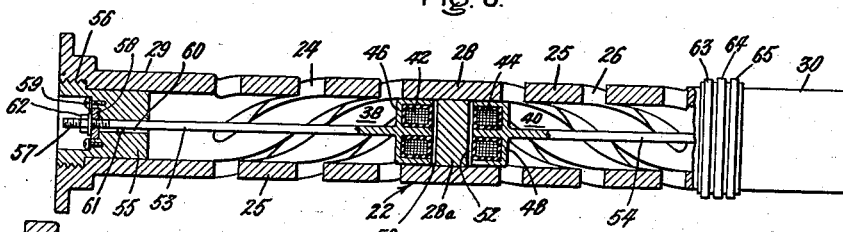
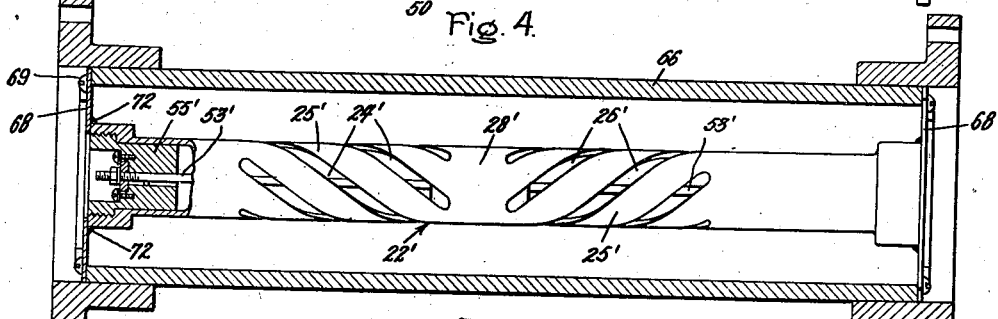
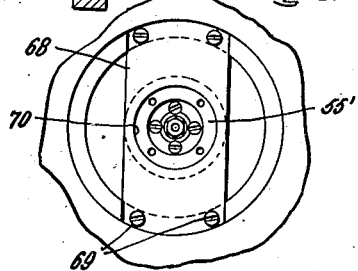
Inventor:
Hans P. Kuehni,
by Harry E. Dunham
His Attorney.

Patented Oct. 21, 1941

2,260,036

UNITED STATES PATENT OFFICE 2,260,036

TRANSMISSION DYNAMOMETER

Hans P. Kuehni, Schenectady, N. Y., assignor to General Electric Company, a corporation of New York Application August 24, 1940, Serial No. 354,102

7 Claims. (Cl. 265—25)

This invention relates to transmission dynamometers and more particularly to transmission dynamometers for electrically measuring the torque, horsepower, and horsepower-hours transmitted by a mechanical shaft.

It is an object of my invention to provide an improved transmission dynamometer for electrically measuring the torsional force and power in a rotating shaft and, if desired, the energy expended over a period of time.

It is another object of my invention to provide an improved transmission dynamometer in which the measuring elements are so positioned with respect to the shaft as an axis to substantially eliminate design difficulties in overcoming centrifugal forces.

It is a further object of my invention to provide an improved transmission dynamometer whereby the torsional twist of the power transmitting member is translated into longitudinal displacements, the measurements of which are proportional to the torque transmitted.

In carrying out my invention in its preferred form I provide a hollow shaft element of generally cylindrical form which is adapted to be positioned intermediate the driving element and the driven member for transmitting the driving torque. The hollow member has a plurality of spaced helical slots formed in the surface thereof on one side of an intermediate portion and has similar spaced helical slots formed in the surface thereof on the opposite side of the intermediate portion. The slots on one side of the intermediate portion of the hollow member are in the lefthand direction while those formed on the other side are in the righthand direction, the slots in each case being preferably arranged such that their pitch angle is substantially 45°. Upon the transmission of power through the hollow element the intermediate portion undergoes an axial movement, the direction of which is dependent upon the direction of the torque transmitted. I provide a pair of electric gage elements which are preferably arranged along the axis of the shaft and inside the hollow member for obtaining indications in accordance with the longitudinal movement of the intermediate section of the hollow member. These gage elements are connected in an electrical circuit whereby indications are obtained proportional to the torque transmitted. If desired, a voltage may be derived which is proportional to the speed of the shaft and by the employment of a wattmeter type instrument having one element energized in accordance with torque and the other element energized in accordance with speed, indications proportional to horsepower may be obtained. Also, if desired, an integrating type measuring device may be employed to provide a measurement of the horsepower hours expended over a period of time.

In a modification, the hollow member of the foregoing type is floatingly positioned within a larger hollow cylindrical member, the latter member serving to transmit the actual power. In this case, the hollow member provided with the helical slots may be made relatively small since it depends for its operation upon the mechanical twist which takes place in the larger torque transmitting element. The electric gage torque measuring element therefore measures the longitudinal movement of the central member as determined by the twist angle of the larger element.

The novel features which are characteristic of my invention are set forth with particularity in the appended claims. My invention itself, however, both as to its organization and method of operation together with further objects and advantages thereof may best be understood by reference to the following description taken in connection with the accompanying drawing.

In the drawing Fig. 1 is a schematic diagram showing two helical springs, one of the righthand type and the other of the lefthand type for the purpose of illustrating the principle of my invention. Fig. 2 is a longitudinal view in elevation of apparatus arranged in accordance with my invention. Fig. 3 is a longitudinal view, partly in cross section, of the torque transmitting element of Fig. 2. Fig. 4 is a modification in which a relatively small hollow measuring element with slots formed therein is positioned within a larger hollow element which transmits substantially all of the torque. Fig. 5 is an end elevation view of the apparatus shown in Fig. 4, and Fig. 6 is a diagram of electrical connections which shows a manner of connecting the gage coils in an electrical circuit for obtaining indications in accordance with the torque, horsepower, and horsepower hours transmitted between a driving and driven element.

Referring to Fig. 1, in order to illustrate the principle of my invention, I have shown two coil or helical springs 10 and 12. The coil spring 10 having a righthand helix is fastened at one end to a disk 14 and at the other end to an intermediate disk 16. The coil spring 12 having a lefthand helix is fastened at one end to a disk 18 similar to the disk 14 and to the opposite side of the intermediate disk 16 from that which supports one end of the coil spring 10. In the form shown the springs are rectangular in cross section. If it be assumed that the two outer disks 14 and 18 are maintained at a constant distance from each other and that torque is transmitted through the system, the intermediate disk 16 will move axially in one direction or the other as shown by the arrow 20, the direction being determined by the direction of the torque, because of the fact that the coils or springs 10 and 12 tend to shorten or lengthen, respectively, depending upon the torque applied. The direction of movement also depends on whether the helical members are constructed so that the stiffness is greater in the axial direction than in the radial direction or vice versa. The amount of movement of the central disk 16 for a given torque depends upon the shape of the cross section of the coil springs and the angle of each helix.

In Figs. 2 and 3 I have shown the fundamental principle of Fig. 1 translated to an actual power transmitting shaft by the provision of a hollow member 22 in which the lefthand portion is provided with spaced righthand helical slots or apertures 24 and the righthand portion is provided with lefthand spaced helical slots or apertures 26. The slots may conveniently be formed by a milling machine. The central portion of the hollow member 22 which lies intermediate the slotted sections and which corresponds to the central disk 16 of Fig. 1 is left solid as indicated at 28. In the arrangement illustrated, the opposite end portions 29 and 30 of the hollow member or torsion device 22 are mounted in suitable bearing elements 31 and 32 and are adapted to be connected by suitable coupling devices 33 and 34 to shaft sections 35 and 36 one of which is connected to a power source and the other of which is connected to a power absorbing device. It is assumed that all thrusts in the direction of the longitudinal axis of the shaft are taken up by the couplings and the bearing elements.

In order to obtain indications proportional to the axial movement of the central or intermediate portion 28 of the hollow torsion element 22 I provide a pair of electric gage elements 38 and 40 which include current coils 42 and 44 and magnetic cores 46 and 48 are arranged within the intermediate section 28 and are symmetrically disposed on opposite sides of a disk-like member 28a of magnetic material to form with the latter member air gaps 50 and 52, respectively. The member 28a may be secured in position by a press fit or by other suitable means. The magnetic cores 46 and 48 and the disk-like member 28a are preferably composed of a suitable magnetic material in laminated or solid form having relatively high permeability and low coercive force, such for example as soft iron or other well known materials. It will be appreciated that the member 28a may be formed integrally with the section 28. In such case the whole shaft section 22 may be composed of magnetic material or magnetic inserts may be positioned on opposite sides of the member 28a to cooperate with each of the cores 46 and 48.

While I have shown the right and lefthand helical members or elements made integrally with the shaft member 22 including the section 28, and have described them as being formed by a milling operation, I wish to point out that this is merely an illustration of a manner of constructing the parts for carrying out my invention. For example, the helical elements may be composed of separate springs or helices and each joined to an intermediate member and a member or element at each end.

The gage coils and cores are secured to studs or rods 53 and 54 each of which is mounted at opposite ends of the torsion element 22 in a plug member 55 which is provided with screw threads 56 adapted to engage the interior of the hollow member 22. The rods 53 and 54 are provided with screw threads 57 which engage the threads in a nut 58, the latter being secured in position to the plug 55 by a plurality of screws 59. A longitudinal keyway 60 adapted to accommodate a key 61 provides means for preventing rotation of the rods 53 and 54 relative to the plugs 55. With this arrangement the position of the gage elements 38 and 40 may be adjusted lengthwise to properly proportion the air gaps 50 and 52 without turning the rods 53 and 54 merely by loosening the screws 59 and rotating the nut 58. A lock nut 62 provides means for holding the parts securely in position. The gage coils may be connected in series circuit relation interiorly of the hollow torsion member 22 with their end terminals and a connection at their junction brought out to a plurality of slip rings 63, 64 and 65, respectively.

In the modification shown in Figs. 4 and 5, I have shown a slotted element 22' which is similar to the element 22 but which may be made of considerably lighter material because it is not required to transmit the actual load torque. In this case, the hollow element 22' is floatingly positioned within a larger hollow shaft section 66 which transmits the actual torque. The torque element 22' is supported in the hollow shaft 66 at each of its ends by means of members 68 in the form of plates each having an opening 70 formed therein to permit insertion of the gage elements and removal of the plug 55'. Each plate may be connected conveniently with the hollow member 66 by a plurality of screws 69 and it may be welded to the torsion element 22' as indicated at 72. The members 68 should be made flexible in the axial direction of the shaft but stiff in a direction at right angles thereto, that is, in the direction of the torsional force.

The torsion element 22' is thus supported in the hollow shaft 66 in such a manner that no lengthwise thrust is applied to this element, but it is readily twisted by an amount corresponding to the twist angle existing between the opposite end portions of the main torsion element 66 under load conditions. The electric gage elements measure the relative sizes of the air gaps 50 and 52 which is a measure of this torsion or twist angle. This arrangement has the advantage that the same torque element 22' can be employed with a plurality of main torsion elements 66 of different sizes.

In the construction of the hollow torsion elements 22 and 22', for most satisfactory results, the helical slots 24, 26 and 24', 26' are preferably arranged with a pitch angle of substantially 45°. The cross section of these elements as indicated at 25, 25' is arranged in the form of a rectangle preferably with the long side of the rectangle parallel to the axis of rotation. With such an arrangement the helical members or sections are quite stiff in the axial direction. Hence if in Figs. 2 and 3 torque is applied at the left hand end in a clockwise direction as viewed from the left hand end, the stiffness of the helices in an axial direction will resist change in pitch and the left hand helix will expand or increase in diameter and shorten in length and the right hand helix will have its diameter reduced and its length increased, thereby causing movement of the central portion 28 to the left. So far as the operation of the device is concerned, however, each helix may be constructed with the long sides of the rectangle lying in planes perpendicular to the axis of rotation, in which case the helical sections will be relatively stiff in the radial direction. Such an arrangement will resist change in diameter when torque is applied but the pitch and length will change. The motion along the rotary axis of the central member 28a for a given torque will be relatively opposite in the two cases.

In Fig. 6, I have illustrated a manner of connecting the gage elements in an electric circuit for obtaining indications in accordance with the movement of the intermediate member 28a. In this arrangement, the coils 42 and 44 are shown connected in adjacent arms of a Wheatstone bridge circuit, the remaining arms of which are formed by sections 74 and 76, respectively, of a differential reactor 78. The bridge is energized by a suitable source of alternating current 80. The outer terminals of the bridge are shown connected to an electrical indicating instrument 82 through a full wave rectifier element 84. If it is desired to record the variations in torque, a recording element such for example as an oscillograph or other recording device 85 may be connected to the output terminals of the rectifier element 84.

In the event that it is desired to obtain measurements of the horsepower or horsepower hours transmitted I may provide a pilot generator 86 preferably having a permanent magnet field and which is mechanically connected to the rotary shaft and adapted to generate a voltage proportional to the speed. The letter M designates a meter either of the integrating type or of the wattmeter type of any suitable construction having one element thereof connected to the pilot generator 86 and the other element connected to the output terminals of the rectifier element 84. Thus when a control spring or the equivalent is employed in the meter M the indications will then be proportional to the horsepower transmitted. While if the meter M is of the integrating type—in which case the control spring is omitted—the instrument M will register the energy expended over a period of time.

In operation, assume that the shaft element 35 is rotating in a clockwise direction as viewed from the lefthand end of the shaft to transmit power to a driven member connected to the shaft section 36. In this case, for the particular cross section shown of the helices, the central section 28 of the hollow shaft 22 will move toward the left thereby increasing the air gap 52 and decreasing the air gap 50 to change the relative reluctance of the two magnetic circuits which are energized by the gage coils 44 and 42. As a result, the relative impedance of the gage coils changes and the condition of balance or degree of unbalance is altered in accordance with the movement of the intermediate member 28a, resulting in corresponding changes in the current flowing through the instrument 82 and the meter M.

I have thus provided a transmission dynamometer including a hollow torsion element of novel construction which is adapted to be positioned to respond to torsional forces required to drive a load. The arrangement as shown has the advantage that the torque pickup or gage elements are arranged near the center of the shaft and they have perfect radial symmetry. Consequently, the torsion shaft may be operated at high speeds without introducing design difficulties due to centrifugal forces.

In accordance with the provisions of the Patent Statutes, I have described the principles of operation of my invention together with the apparatus which I now consider to represent the best embodiments thereof but I desire to have it understood that the apparatus shown and described is only illustrative and that the invention may be carried out by other means.

What I claim as new and desire to secure by Letters Patent of the United States is:

1. In a transmission dynamometer for transmitting power from a driving member to a driven member, a first element and a second element axially spaced from each other and adapted to undergo a relative angular displacement in proportion to the torsional force required to drive said driven member, an element positioned intermediate said first and second elements and adapted to move in an axial direction relative thereto, a righthand spring helix secured at one end to said first element and at the other end to said intermediate element, a lefthand spring helix secured at one end to said second element and at the other end to said intermediate element, whereby one helix is caused to lengthen and the other to shorten and said intermediate member is caused to undergo movement relative to said first and second elements in the direction of the axis of rotation thereof proportional to the angular displacement between said first and second elements, and means responsive to said relative movement.

2. In a device of the class described for transmitting power from a driving member to a driven member, a torque responsive device adapted to be positioned between said driving and driven members, said torque responsive device comprising a first element and a second element axially spaced from each other and adapted to be connected one to said driving member and the other to said driven member, means for mounting said first and second elements in a manner permitting rotation but preventing relative movement thereof in an axial direction, said torque responsive device further comprising a third element positioned intermediate said first and second elements and free to move in an axial direction, a righthand spring helix secured at one end to said first element and at the other end to said third element, a lefthand spring helix secured at one end to said second element and at the other end to said third element, whereby one helix is caused to lengthen and the other to shorten and said third element undergoes a movement in the direction of the axis of rotation in proportion to the angular displacement between said first and second elements, and means for measuring the axial movement of said third element.

3. In a transmission dynamometer for transmitting power from a driving member to a driven member, a hollow shaft element in the general form of a cylinder adapted to be positioned between said driving and driven members, said hollow shaft element being supported for rotation at each of its ends in a manner to prevent relative axial movement between said end portions, said hollow member having a plurality of spaced righthand helical slots formed therein between one end and an intermediate section thereof and having a plurality of spaced lefthand helical slots formed therein between the other end and said intermediate section, whereby said intermediate section undergoes a movement in the direction of the axis of rotation in proportion to the torque transmitted through said hollow member, and means responsive to said axial movement.

4. In a transmission dynamometer for transmitting power from a driving member to a driven member, a shaft element positioned intermediate said driving and driven members for transmitting said power and adapted to undergo a torsional twist in accordance with the torsional force required to drive said driven member, a torque responsive device comprising a first element and a second element, said elements being secured to said shaft element at axially spaced points thereof and adapted to undergo an angular displacement with respect to each other proportional to the twist in said shaft element, said torque responsive device further comprising a third element positioned intermediate said first and second elements and adapted to move axially relative thereto, a righthand helix rigidly secured at one end to said first element and at the other end to said third element, a lefthand helix rigidly secured at one end to said second element and at the other end to said third element, said helices having a relatively small resistance to torsional forces as compared to said shaft element, whereby said third element undergoes a movement in the axial direction relative to said first and second elements proportional to the relative angular displacement of said first and second elements, and means responsive to said axial movement.

5. In apparatus of the class described, a hollow member of generally cylindrical form arranged for transmitting mechanical power between a driving member and a load, the end portions of said hollow member being rotatably mounted but restrained from relative axial movement and subject to angular displacements with respect to each other in accordance with the torque required to drive said load, said hollow member having a portion thereof lying between one of said end portions and an intermediate portion thereof cut away to form a plurality of spaced righthand helical apertures therein, said hollow member having a portion thereof lying between the other of said end portions and said intermediate portion cut away to form a plurality of spaced lefthand helical apertures therein, means composed of magnetic material positioned internally of said hollow member and rotatably and axially movable with said intermediate portion, a pair of electromagnetic circuit elements each comprising a core of magnetic material and a current conducting winding adapted to be energized by alternating current, the cores of said magnetic circuit elements being positioned each to form air gaps with said magnetic material means which air gaps vary in relatively opposite directions upon axial movement of said intermediate portion, and means operable in accordance with relative changes in the reactances of said current conducting windings for obtaining a measurement proportional to the torque required to drive said load.

6. In combination in apparatus of the class described, a hollow member of generally cylindrical form mounted for rotation and arranged in such a way that its end portions are subjected to a relative angular displacement in proportion to the torsional force required to drive a load, said hollow member having a plurality of spaced righthand helical slots formed therein between one end and an intermediate section thereof, said hollow member having a plurality of spaced lefthand helical slots formed in the portion of its surface lying between the other end thereof and said intermediate section, whereby said intermediate section undergoes a movement along the axis of rotation in proportion to the relative angular displacement of said end portions, a member composed of magnetic material secured to said intermediate section, electromagnetic means comprising a magnetic core and an electrical coil, said core being arranged in spaced relation with the magnetic member and said spacing being variable in accordance with axial movements of said intermediate section, said coil being adapted to be energized with alternating current for sending magnetic flux through said magnetic core and said magnetic member, and means operable in accordance with reactance changes in said coil caused by variations in the spacing of said core and said magnetic member.

7. In a transmission dynamometer for transmitting power from a driving member to a driven member, a torque transmitting element interposed between said driving and driven elements and having its opposite end portions connected respectively to said driving and driven members, means for mounting said torque transmitting element at its end portions in a manner to permit rotation and to restrain said end portions from relative axial movement, said torque transmitting element comprising lefthand and righthand helical elements positioned intermediate said end portions and connected by an axially aligned intermediate element whereby said intermediate element undergoes an axial displacement relative to said end portions when said end portions are subjected to angular displacements with respect to each other in accordance with the torque transmitted to said driven member, electric gage means comprising magnetic circuit members and electrical winding means for producing magnetic flux in said magnetic circuit members, one of said magnetic circuit members being mounted to move axially with said intermediate element, said magnetic circuit members being arranged in relatively spaced relation, said spacing being variable in accordance with the axial movement of said intermediate element, means for energizing said winding means with alternating current, and means connected in circuit with said coil and responsive to current variations therein caused by changes in the spacing of said magnetic members.

HANS P. KUEHNI.

CERTIFICATE OF CORRECTION.

Patent No. 2,260,036.  October 21, 1941.

HANS P. KUEHNI.

It is hereby certified that error appears in the printed specification of the above numbered patent requiring correction as follows: Page 2, first column, line 49, after "48" insert --, respectively. The magnetic cores 46 and 48--; page 4, second column, lines 13 and 14, claim 6, strike out "in the portion of its surface lying" and insert instead --therein--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.